United States Patent
Klosowiak et al.

(10) Patent No.: US 7,857,460 B2
(45) Date of Patent: Dec. 28, 2010

(54) IMAGE STABILIZATION IN A LASER-SCANNING BASED PROJECTOR

(75) Inventors: Tomasz L. Klosowiak, Glenview, IL (US); George T. Valliath, Winnetka, IL (US); Dmitriy Yavid, Stony Brook, NY (US)

(73) Assignee: Motorola Mobility, Inc., Libertyville, IL (US)

( * ) Notice: Subject to any disclaimer, the term of this patent is extended or adjusted under 35 U.S.C. 154(b) by 605 days.

(21) Appl. No.: 11/861,568

(22) Filed: Sep. 26, 2007

(65) Prior Publication Data

US 2009/0079945 A1   Mar. 26, 2009

(51) Int. Cl.
    G03B 21/28    (2006.01)
(52) U.S. Cl. .............. 353/69; 353/70; 353/101
(58) Field of Classification Search ........... 353/69, 353/70, 101, 122, 46; 348/745–747, 806
    See application file for complete search history.

(56) References Cited

U.S. PATENT DOCUMENTS

| | | | | |
|---|---|---|---|---|
| 6,056,408 | A * | 5/2000 | Kobayashi | 353/122 |
| 7,555,143 | B2 * | 6/2009 | Flath et al. | 382/109 |
| 2003/0223049 | A1 * | 12/2003 | Ohara | 353/101 |
| 2005/0140925 | A1 | 6/2005 | Yavid et al. | |
| 2005/0237297 | A1 | 10/2005 | Holloway et al. | |
| 2006/0103811 | A1 | 5/2006 | May et al. | |
| 2007/0097335 | A1 | 5/2007 | Dvorkis et al. | |
| 2007/0195276 | A1 | 8/2007 | Plut | |

FOREIGN PATENT DOCUMENTS

| | | |
|---|---|---|
| JP | 2005122696 | 5/2005 |
| WO | WO2006/072656 | 7/2006 |

OTHER PUBLICATIONS

Se Gyoung Lee, "PCT International Search Report and Written Opinion,"WIPO, ISA/KR, Korean Intellectual Property Office, Daejeon, Republic of Korea, Dec. 23, 2008.
"Exploring Interaction with a Simulated Wrist-Worn Projection Display;" Proceedings of the 2005 Ninth IEEE International Symposium on Wearable Computers (ISWC'05).
"Interaction Using a Handheld Projector" by Paul Beardsley, Jeroen Van Baar, Ramesh Raskar, and Clifton Forlines, Mitsubishi Electric Research Labs, Jan./Feb. 2005.

\* cited by examiner

*Primary Examiner*—Tony Ko

(57) ABSTRACT

A projector assembly includes a multi-pixel frame projector that sequentially projects each pixel making up a frame to a viewing surface, a movement detector coupled to the projector to detect a physical movement of the projector, and a movement compensator coupled to the projector, the movement compensator operable to transmit a correction signal to the projector, the correction signal capable of causing the projector to compensate for the detected movement.

12 Claims, 9 Drawing Sheets

IMAGE STABILIZATION IN A LASER-SCANNING BASED PROJECTOR

FIELD OF THE INVENTION

This invention relates in general to image stabilization, and more particularly, to image position stabilization in a portable laser scanning based projector.

BACKGROUND OF THE INVENTION

A video projector receives a video signal and projects the corresponding image on a projection screen or any other surface. Video projectors use a bright light to project the image, and most modern ones can correct any curves, blurriness, and other inconsistencies through manual or automatic settings. Video projectors are widely used for conference room presentations, classroom training, home theater, and many more applications.

Recent technological developments have made it possible to place all of the necessary projector components within the small package of a handheld device, such as cellular telephones, PDAs, laptops, portable music players, gaming devices, and the like. A specific projection technology that is particularly well suited for use in small portable devices is Laser Projection Display (LPD). LPD is a projection display technology that uses three different colored lasers coupled with scanning mirrors to produce full color, high resolution images. Their small size and low power usage make LPD projectors a great choice for use in these small packages.

One problem with hand-held projectors is image stability. If a user's hands tremble or move, the image that he is projecting will naturally reflect this movement of the user's hands. This problem is amplified as the distance between the user and the projection surface increases.

An attempt has been made to automatically compensate for movement of a projector. This approach detects movement of the projector by constantly monitoring a static object or through movement detection means, such as a gyroscope, a ball of liquid, and/or acceleration sensors. Once movement is detected, the movement is compensated for by moving a mirror that reflects the entire rendered frame to the viewing surface. This process allows repositioning of an entire image.

LPD scanning projectors reflect each pixel, one at a time, systematically, in rows and column. To accomplish this precise reflection, LPD scanning projectors utilize two mirrors that move at different speeds. To stabilize an LPD image using the prior-art method for projectors, an additional driven mirror that would reflect the entire image would have to be added and controlled. This would add cost, size, and an increase in potential failures. Prior-art image compensation methods have not addressed adjusting multiple mirrors with varying speeds.

Therefore, a need exists to overcome the problems with the prior art as discussed above.

SUMMARY OF THE INVENTION

The present invention, according to an embodiment, is projector assembly that includes a multi-pixel flame projector that sequentially projects to a viewing surface each pixel that makes up a frame, a movement detector coupled to the projector to detect a physical movement of the projector, and a movement compensator coupled to the projector, the movement compensator operable to transmit a correction signal to the projector, the correction signal capable of causing the projector to compensate for the detected movement.

In accordance with another feature, the present invention also includes a first movable mirror, a first mirror controller communicatively coupled to the first movable mirror and to the movement compensator and adapted to control and move the first movable mirror at a first speed, a second movable mirror, and a second mirror controller communicatively coupled to the compensator and to the second movable mirror and adapted to control and move the second movable mirror at a second speed that is different from the first speed, wherein the movement compensator, in response to receiving a signal from the movement detector that the projector has moved, communicates compensation signals to the first and second mirror controllers, the compensation signals capable of causing the first and second mirror controllers to compensate for the detected projector movement.

In accordance with an additional feature, the present invention includes a first movable mirror, a second movable mirror, and a movable cradle securing the first and second mirrors at a fixed distance from each other and communicatively coupled to the movement compensator, wherein the movement compensator, in response to receiving a signal from the movement detector that the projector has moved, communicates a compensation signal to the cradle, the compensation signal capable of causing the cradle to compensate for the detected projector movement.

The present invention, according to yet another feature, includes a distance measurement device coupled to the movement compensator for determining a distance from the projector to the viewing surface.

In accordance with a further feature of the present invention, the projector compensates for the detected movement by adjusting a timing of a light source.

The present invention, in accordance with yet a further feature, includes a comparator operable to compare a magnitude of projector movement to a movement limit value and discontinue transmission of a compensation signal if the magnitude of projector movement is greater than the movement limit value.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Figure 1:
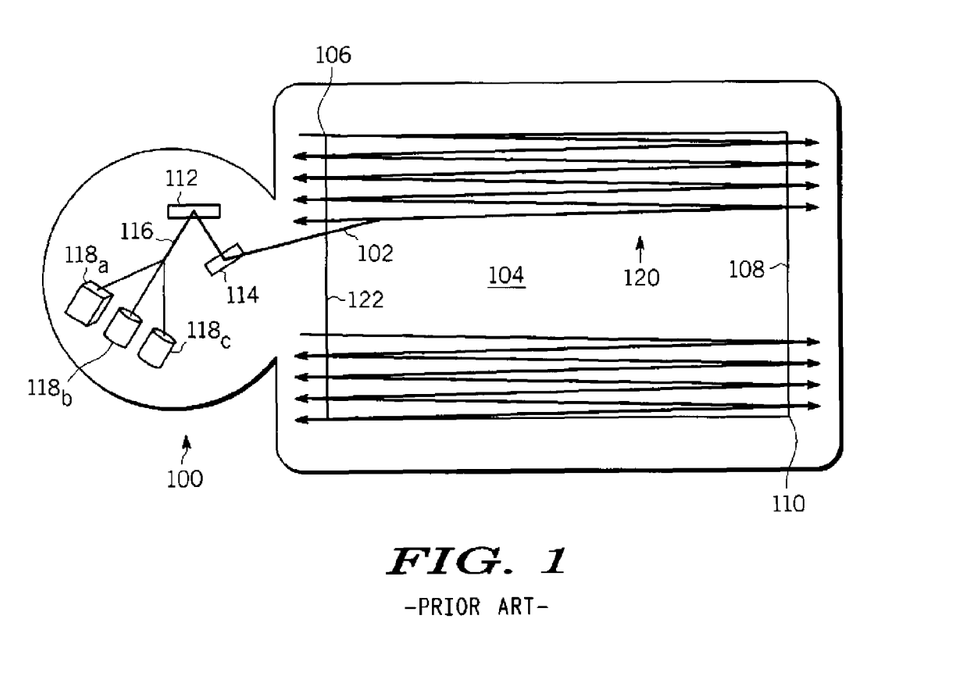
FIG. 1 is a diagrammatic illustration of a prior art LPD projector system.

The present invention provides a novel and efficient image stabilization system for use with hand-held projectors that utilize laser projection display (LPD) techniques. With reference now to the figures, FIG. 1 illustrates diagrammatically an LPD projector 100 transmitting image information 102 to a viewing surface 104. LPD projectors function differently than traditional projectors. The main difference between the two is that, instead of transmitting an entire image to the viewing screen 104, as is done with traditional projectors (e.g. liquid crystal display (LCD), digital light processing (DLP), liquid crystal over silicon (LCoS)), LPD projectors transmit one pixel at a time. This single pixel transmission is performed sequentially at a very high rate of speed, starting from an upper corner 106 of the viewing surface 104, moving across a single row to the opposite edge 108 of the viewing surface 104, and continuing row-by-row until the scan reaches the bottom right corner 110 of the viewing surface 104. This row-by-row scanning is analogous to cathode ray tube (CRT) technology, but, instead of guiding electrons with a magnetic field, as is done with a CRT, a beam of light 116 is directed to the viewing surface 104 by a pair of moving mirrors 112 and 114.

Figure 2:
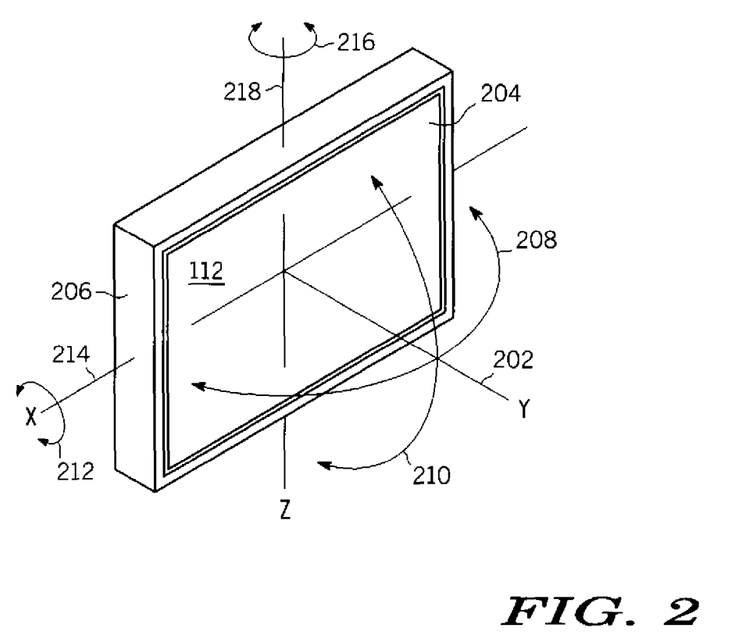
FIG. 2 is a perspective view of a set of movable movement-compensating reflecting mirrors, according to an embodiment of the present invention.

FIG. 2 shows a more detailed and enlarged view of the mirrors 112 and 114. In LPD projectors, the mirrors 112 and 114 work as a light "switches" that are electronically controlled to move to a plurality of reflecting positions. By moving the position of the mirrors, light is reflected off of the mirror surface and is aimed a specific location. Each of these locations is a pixel on the screen where the image is being displayed and when scanned at a high speed, produces a complete viewable image.

The first mirror 112, depending on the particular embodiment of the present invention, is able to move incrementally in at least one of two possible axes. Movement of the mirror 112 is controlled by a first mirror controller 206 that can tilt, or rotate, the mirror 112 anywhere along at least one of two axes. This movement is done with great precision. The angles of movement are represented in FIG. 2 by an imaginary center line 202 that is drawn orthogonal to the surface 204 of the first mirror 112. Movement along an arc 210 represents an axial rotation 212 of the X axis 214. Likewise, movement along a first arc 208 represents an axial rotation 216 of the Z axis 218. In other words, when the mirror 112 is moved along a first axis 218, the centerline 202 follows an arc 208 and when the mirror 112 is moved along a second axis 214, the centerline 202 follows a second arc 210. In its traditional use in an LPD projector, the first mirror 112 is responsible for drawing pixels in a row and rotates only along the Z axis 218.

The second mirror 114 is also able to move incrementally in at least one axis. Movement of the second mirror 114 is controlled by a second mirror controller 220 that can tilt the mirror 114 anywhere along the axis, and in some embodiments, along two axes. This movement by the controller 220 is done with great precision. Two possible angles of movement are represented in FIG. 2 by an imaginary center line 222 that is drawn orthogonal to the surface 224 of the second mirror 114. In its typical use in an LPD projector, the mirror 114 is responsible for sequentially moving from one row to another and is rotated 228 axially along its X axis 230. When the second mirror 114 is rotated along this X axis 230, the centerline 222 follows an arc 226. In some embodiments of the present invention, the mirror 114 is rotated 232 along a Y axis 234, causing the centerline 222 follows a second arc 236.

As will be explained below, movement corrections can be achieved by causing the first 112 and second 114 mirrors to move along the axes just defined, or to move along hybrid combinations of these axes to achieve a multitude of angles, as necessary.

The function of the mirrors 112 and 114 will now be explained in more detail. As shown in FIG. 1, the LPD projector 100 focuses a ray of light 116 that is made by combining the output of a set of three lasers 118a-c, each of a different color, onto the first mirror 112. Although the invention is not so limited, the first mirror 112 is a dedicated horizontal row mirror. In other words, the function of the first mirror 112 is to rotate along axis 218 (along arc 208 shown in FIG. 2). However, before light reflecting off of the first mirror 112 reaches the viewing surface 104, it is directed onto the reflective surface 224 of the second mirror 114. The second mirror 114 is a dedicated vertically moving mirror. In other words, the main function of the second mirror 114 is to incrementally rotate along axis 230.

In operation, mirror 112 moves along an entire row, drawing each pixel, before the second mirror 114 incrementally rotates along axis 230 and moves the focused beam 102 down to the next row. In one embodiment, a single frame drawn by the LPD projector 100 has 768 lines with 1,024 pixels per line. The resulting scanning pattern 120 is shown in FIG. 1. Therefore, the first mirror 112 moves to 1,024 pixel locations for each movement of the second mirror 114, i.e., the first mirror 112 moves at a higher speed than the second mirror 114.

As is known, video is normally shown at a speed of 60 frames per second. To the human eye, this speed of flipping through frames looks like fluid motion. For the present discussion, a half cycle is defined as a movement from the left edge 122 of the viewing surface to the right edge 108 of the viewing surface. The laser also draws a line of pixels as it moves from the right edge 108 back to the left edge 122, which is another a half cycle. With the frame speed set at 60 frames per second, the speed of the first mirror is a rapid 23,000 cycles per second. At this speed, the modulation speed of the lasers 118a-c is 47 MHz (1,024 pixels/line×2 lines/cycle×23,000 cycles/second).

The mirror controllers 206 and 220 are shown as generic blocks in FIG. 2. The mechanics of how the controllers 206 and 220 move the mirrors 112 and 114, respectively, are not important to the present invention and will not be described here in detail. All that should be understood is that the controllers 206 and 220 are able to move the mirrors 112 and 114 along the axes or any combination of the axes shown in FIG. 2 and respond to signals to rapidly position the mirrors 112 and 114 at precise positions.

Figure 3:
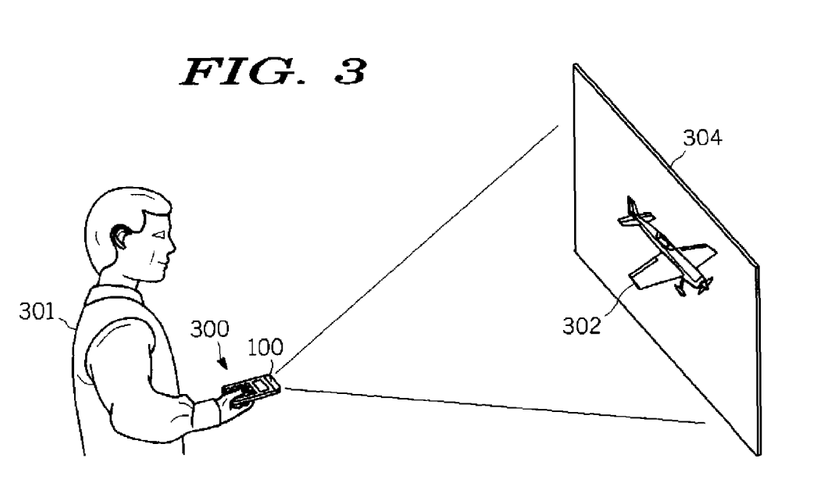
FIG. 3 is a perspective view of a user employing a hand-held LPD projector, according to an embodiment of the present invention.

FIG. 3 shows the LPD projector 100 packaged in a hand-held device 300, such as a cellular phone. LPD projectors are particularly well-suited for hand-held applications because of their small size, low power consumption (less than 4 watts), and impressive light output (around 10 lumens). Having a projector in a hand-held device is advantageous in that the image(s) output by the device can be broadcast to any desirable surface, whether a screen 304, a plain wall, a table top, or many others. However, when the person 301 holding the device 300 moves, so too does the image 302 being broadcast from the projector 100. This can be distracting to the viewer and embarrassing or annoying to the person holding the device 300.

Figure 4:
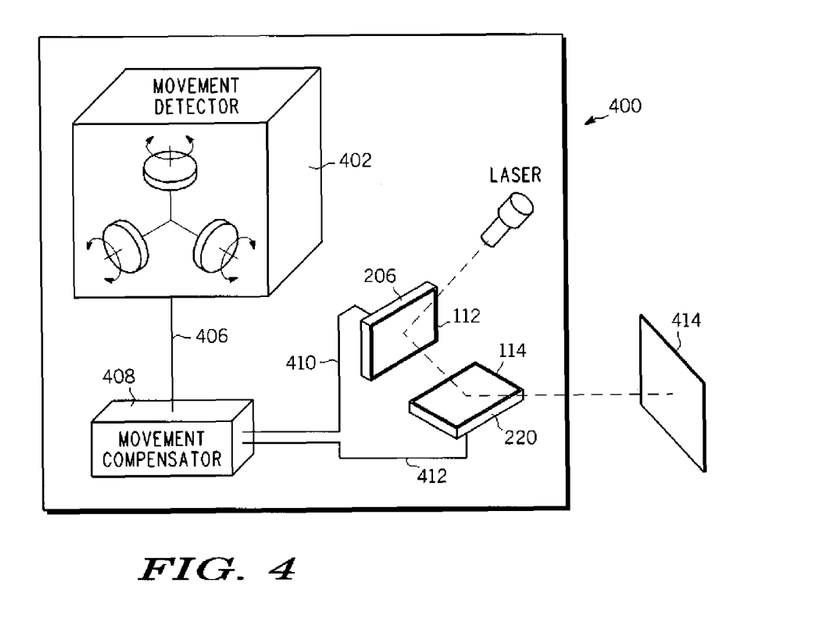
FIG. 4 is a block diagram of a movement-compensating LPD projector assembly, according to an embodiment of the present invention.

To combat undesirable movement of the image(s) on the viewing surface 104 caused by movement of the projecting unit 300, the present invention, as shown in the block circuit diagram of FIG. 4, includes a movement detector 402 within the LPD projector unit 400. The movement detector 402 can be any device that senses the presence and, preferably, amount of movement. One exemplary detector can be an Inertial Measurement Unit (IMU), which is a closed system that is used to detect location and motion.

IMUs typically use a combination of accelerometers and angular rate sensors (gyroscopes) to track movement by detecting the current acceleration and rate of change in attitude (e.g., pitch, roll, and yaw rates) and then sums the detected changes to find the total change from the initial position. Accelerometers and the three gyroscopes are placed such that their measuring axes are orthogonal to each other. They measure the so-called "specific forces" (inertial acceleration—gravity). Accelerometers are perhaps the simplest MEMS (Microelectromechanical Systems) device possible, sometimes being no more than a suspended cantilever beam or proof mass (also known as seismic mass) with some type of deflection sensing and circuitry.

The movement detector's 402 response to movement is an output signal along a communication line 406, where the signal is indicative of the amount of movement and the direction of movement. The movement detector 402 is coupled through communication line 406 to a movement compensator 408. The movement compensator 408 is then communicatively coupled along control lines 410 and 412 to the mirror controllers 206 and 220, respectively. Through this configuration, the movement compensator 408, in response to receiving a signal from the movement detector 402, communicates a first compensation signal to the first mirror controller 206 and a second compensation signal to the second mirror controller 220, where the first and second compensation signals are capable of causing the first mirror controller 206 and the second mirror controller 220 to compensate for a detected physical movement of the mirrors 112 and 114.

In other words, as the mirrors 112 and 114 are moving in their normal operational patterns, the compensator signals along lines 410 and 412 will drive the mirror controllers 206 and 220 to steer the mirror in the opposite direction of the movement and in a magnitude sufficient to compensate for the movement so that the image remains substantially or exactly in the same location on the viewing surface 414 as before the movement. Advantageously, this compensation is performed at a speed that makes the movement undetectable to the viewer. Also advantageously, and unlike prior-art correction methods, the present invention can correct an image in the middle of a frame. In other words, the present invention, due to the way that images are rendered with an LPD projector, can correct each individual line within a frame, i.e., less than the entire frame.

Figure 5:
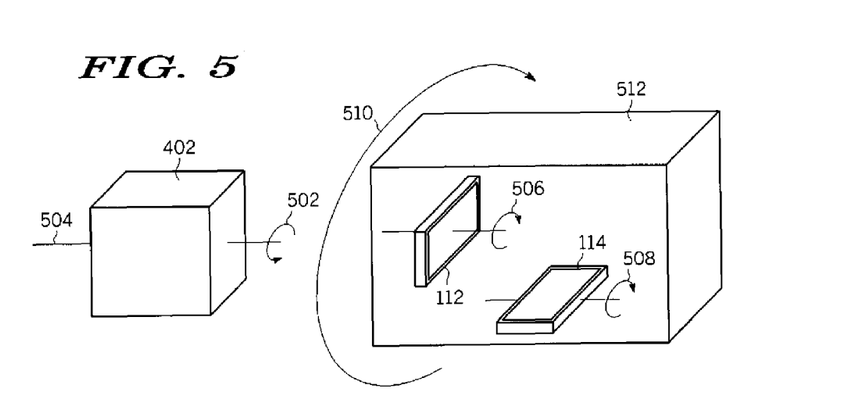
FIG. 5 is an elevated perspective view of a rotationally compensating cradle, according to an embodiment of the present invention.
Figure 6:
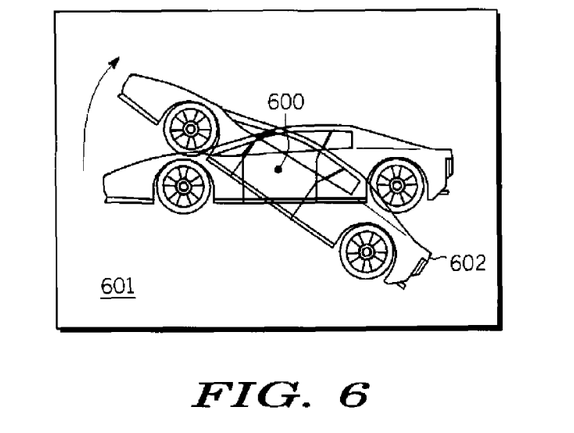
FIG. 6 is an elevational view of a rotated image on a viewing surface, according to an embodiment of the present invention.

There are two basic types of movements that the device can undergo and for which will need to be compensated: rotational movement and translational movement. Many, and probably most movements, are a combination of the two. FIG. 5 shows a rotational movement 502 along an axis 504 of the movement detector 402. The rotational movement 502 is analogous to a twisting motion along an axis. FIG. 6 shows the effect on an image 602 that results from rotational movement along a first axis 504 that is perpendicular to the viewing surface. A rotational movement along axis 504 results in a center point 600 of an image 602 remaining stationary on the viewing surface 601 while the rest of the image 602 is rotated around the center point 600.

Returning to FIG. 5, if rotational movement 502 along axis 504 is detected by the movement detector 402, without any translational movement, which is explained below, the present invention is able to compensate by causing an equal and opposite rotational movement of one or both of the mirrors 112 and 114. The compensation is shown by the rotational arrows 506 and 508, which are in a direction opposite the detected rotation 502. Alternatively, both mirrors 112 and 114 can be rotated together, as shown by arrow 510. In this embodiment, the mirrors 112 and 114 are fixedly coupled to a cradle 512. The cradle 512 is a base for the mirrors 112 and 114, allowing them to move as a single unit. By moving both mirrors 112 and 114 as a unit, any skewing of the physical relational alignment of the mirrors 112 and 114 is avoided. In another embodiment, a rotational movement 502 can be compensated by first moving one or both of the mirrors 112 and 114 until a threshold rotational movement distance is reached and then compensating further with a movement of the cradle 512. This embodiment provides a fast response by the mirror controllers 206 and 220 until the rotational distance can no longer be practically compensated for by the mirrors 112 and 114.

Figure 7:
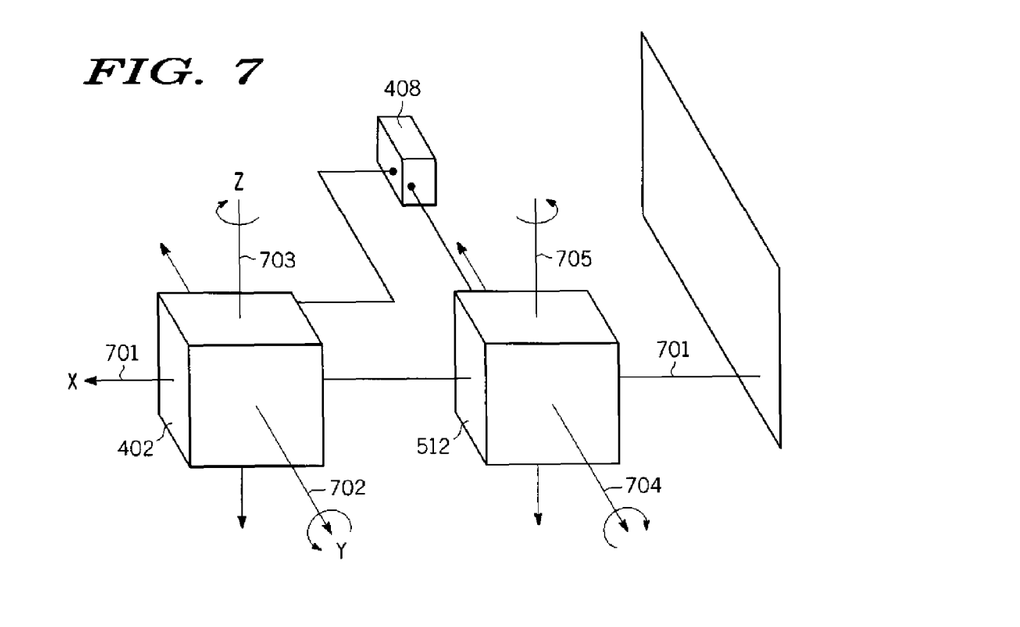
FIG. 7 is a perspective view showing rotational and translational movements of detection and correction within and LPD projector, according to an embodiment of the present invention.

Rotational movement can also include rotation along other axes. FIG. 7 shows the available relational responses of the cradle 512 to a detected rotational movement of the movement detector 402. The response of the cradle 512 is determined and dictated by the movement compensator 408, which calculates the amount of compensation necessary. The movement compensator 408 may be separate from or a part of the cradle 512.

Three main axes of the movement detector 402 are shown in FIG. 7. The three main axes include an X axis 701, a Y axis 702, and a Z axis 703. The motion detector 402, according to one embodiment, is able to sense movement, including velocity, acceleration, and/or rotation and distance of displacement along any or a combination of the axes 701-703. The cradle 512, in this particular embodiment, shares the X axis 701 and also has a corresponding Y axis 704 and Z axis 705, which are parallel to the Y axis 702 and Z axis 703, respectively, of the movement detector 402. In addition to sensing rotation around any or a combination of the axes 701-703, the movement detector 402 can also detect translational movement, which is defined herein as movement along any or a combination of the axes 701-703.

In its simplest form, a movement detected by the movement detector 402 is compensated for by a movement of the cradle 512 in the opposite direction, but not necessarily of equal distance. For instance, a detected movement of the movement detector 402 around the Z axis 703 can be compensated for by a corresponding opposite rotation of the cradle 512 around its Z axis 705.

Figure 8:
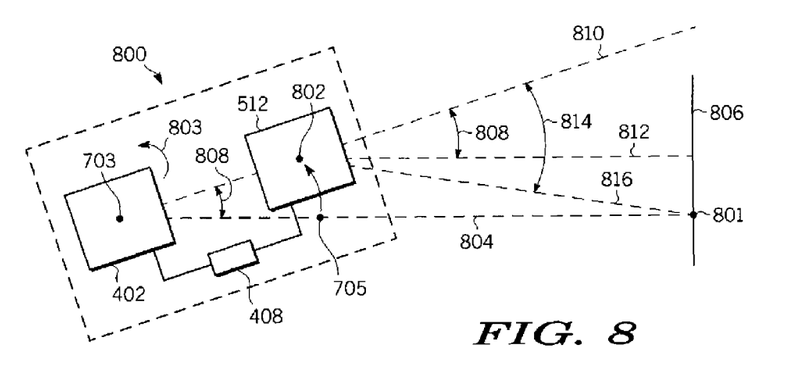
FIG. 8 is a planar view of a handheld LPD projector undergoing and correcting for physical displacement, according to an embodiment of the present invention.

FIG. 8 is a view of the movement detector 402 and the cradle 512 and shows one possible correction made by the cradle 512 in response to a movement of the movement detector 402. In this diagram, it can be seen that the movement detector 402 has been rotated 803 around its Z axis 703. Because the movement detector 402 and cradle 512 are fixedly held in their spatial relationship from each other by the device 800, such as a cellular phone, in which they are placed, the cradle 512 is rotated to the position shown in FIG. 8, where the original Z axis 705 of the cradle 512 has now moved to position 802. Projection line 804 shows the original light path from the Z axis 705 to one pixel 801 on the viewing surface 806. The rotation of the movement detector 402 along its Z axis 703 results in an angle change 808 of N degrees and a new light path 810. A Z axis 802 correction of the cradle 512 equal to N degrees results in a light path 812 that does not project to the original pixel 801. Therefore, a true one-to-one response by the cradle 512 is insufficient in this case. To be precise, the movement compensator 408 calculates a true correction angle 814 that, again, projects the light path 816 to the pixel 801. FIG. 8 and the angular principles shown therein apply, similarly, to rotation along the Y axis 702 of the movement detector 402 as well. LPD projectors are ideal for this type of correction, as their projection method inherently makes the image clear and unskewed, even if projected from an off-center angle, such as that shown in FIG. 8.

Angular movement and correction is well known in the art. It is therefore understood by those of ordinary skill in the art that movement of the movement detector 402 along any axis and, most commonly, a combination of translational and rotational movement are common and that known mathematical principles can be applied to calculate correction angles. Therefore, known trigonometric equations for calculating correction angles are not reproduced here.

Figure 9:
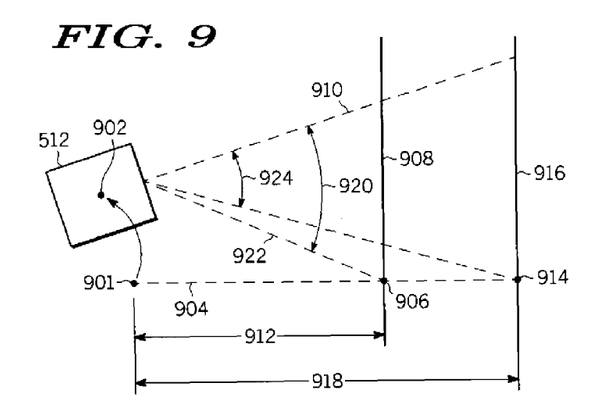
FIG. 9 is a planar view of a handheld LPD projector undergoing and correcting for physical displacement, according to an embodiment of the present invention.

One variable that is useful for calculating correction angles for movements other than a simple rotation along the X axis 701 is the distance between the device 800 and the viewing surface 806. This distance impacts the calculation of the correction angle 814. For instance, FIG. 9 shows a cradle 512 displaced similarly to that shown in FIG. 8. The center Z axis of the cradle 512 is moved from a first point 901 to a second point 902. A first light path 904 travels from the first point 901 to a pixel 906 on a first viewing surface 908 that is at a distance 912 from the first point 901. The first light path 904 also travels from the first point 901 to a pixel 914 on a second viewing screen 916 that is at a distance 918, where the distance 918 is greater than the first distance 912.

The first light path 904 is displaced by the movement of the cradle 512 and no longer points toward the pixel 906. Note that the magnitude of the angles shown is dramatic for ease of illustration. In actual practice, the present invention is able to recognize large movements as intentional and will not implement corrections under certain circumstances. Continuing with the example shown in FIG. 9, the new light path 910 is shown being emitted from the cradle 512. To again align the light path with the pixel 906 on viewing surface 908 that is at the distance 912, a correction angle 920 is needed. However, if the viewing surface is, instead, at distance 918, the correction angle 920 does not cause the resulting light path 922 to intersect with the pixel 914. For a screen that is further away, a smaller correction angle 924 is necessary.

One solution to not knowing the distance value is to always perform the angular correction calculations with an assumed distance. This solution is feasible because LPD projectors that are condensed to fit in small portable devices are intended for projection distances of between 10-12". Therefore, in one embodiment, a distance 912 that equals a value between about 10-12" is used as a constant in the angular calculations. In another embodiment, as will be shown below, the distance from the cradle 512, or one of the mirrors within the cradle 512 is measured.

Figure 10:
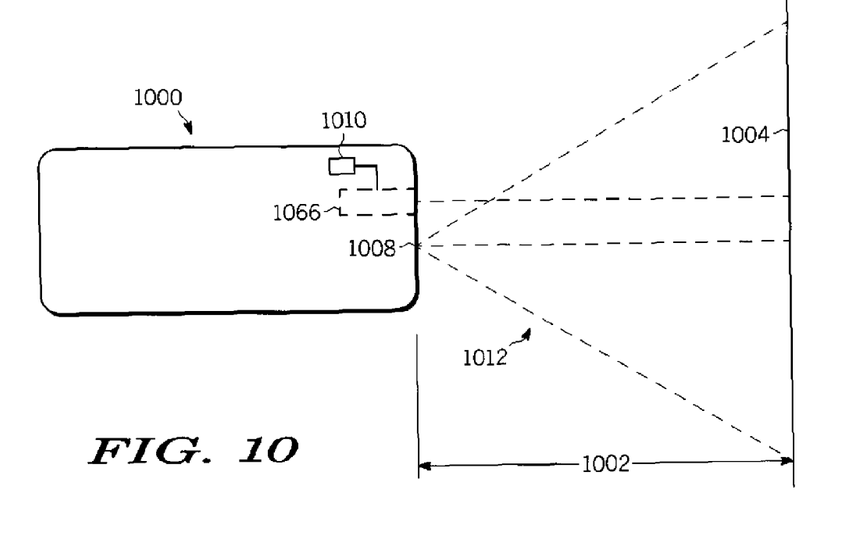
FIG. 10 is an elevational view of a diagrammatic handheld LPD projector with a distance detector, according to an embodiment of the present invention.

FIG. 10 shows a portable device 1000 at a distance 1002 from a viewing surface 1004. In this embodiment, a distance measurement device 1006 is coupled to the portable device 1000. The distance measuring device 1006 can be any known technology for measuring distances, such as those that use infra-red light, lasers, echo reflection, and many others. In one embodiment, the distance measurement device 1006 is a photocell sensor. The photocell sensor 1006 is offset from the laser output 1008 of the device 1000. The photocell sensor 1006 is able to detect when the output laser beam 1012 is reflected from the viewing surface 1004 to the sensor 1006. The distance is then easily calculated by elapsed time and triangulation. In one embodiment, the laser output at a single pixel—or a group of pixels that is less than all of the pixels being broadcast—is used as the output 1008 that triggers a timer 1010. Once the photocell 1006 receives the reflected light, the timer 1010 is stopped. It is this elapsed time that is used to determine the distance from the device 1000 to the reflecting surface 1004.

Figure 11:
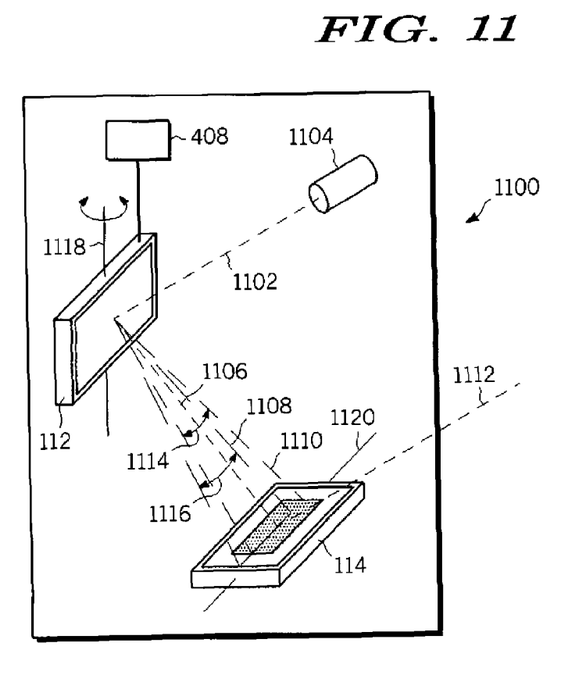
FIG. 11 is a perspective view showing rotational and translational correction by the mirrors within the LPD projector, according to an embodiment of the present invention.

In one embodiment of the present invention, as shown in FIG. 11, the mirrors 112 and 114 are fixedly attached to the device 1100. In other words, there is no movable cradle in this embodiment. The mirrors 112 and 114 are rotatable on their several axes and are able to provide a certain amount of correction to compensate for slight movements of the device 1100. As was mentioned briefly above, it is likely that only slight movements of a device 1100 need to be corrected, as large movements are assumed to be purposeful by the holder of the device. Automatically correcting movements that are intentional can be frustrating to the user and, in the case of laser projection, can be dangerous to one's eyes. Therefore, in some embodiments of the present invention, a correction amount is preset, either at the time of manufacturing, programming, or user definable, and, once the correction amount is exceeded, the movement compensator 408 no longer attempts to compensate for the movement.

As is shown in FIG. 11, the first mirror 112 receives a focused laser beam 1102 from one or a group of lasers 1104. The movable mirror 112 directs a reflected beam 1106 to the second mirror 114. Again, the first mirror 112 is very fast and precise and is able to move in a way that places the reflected beam along a line 1110 on the second mirror 114. To draw the full line, the first mirror 112 pivots along an axis 1118 and reflects the incident light beam 1102 along an angular range 1114. Each time the first mirror 112 completes a pass along the line 1110, the second mirror will tilt along an axis 1120 the equivalent of one line on the viewing surface and the first mirror 112 will make another pass along the line 1110. The beam 1112 is then reflected off of the second mirror 114 to a viewing surface (not shown). In this embodiment, the second mirror 114 has a surface area 1108, where less than all of the surface area (shown as a shaded area) is used by the first mirror 112 to draw the line 1110.

To provide correction for detected movement of the device 1100, the movement compensator 408 directs the first mirror 112 to use a portion of surface 1108 of the second mirror 114 that is normally unused. The first mirror 112 responds by using a modified angular range 1116. This adjustment will cause the reflected image line to be shifted from the previous reflected image line, thus adjusting the rendered image on the viewing surface.

Again, angular mathematics are well known to those of average skill in the art. As should now be clear from the present discussion, either one or both of the mirrors 112 and 114 can be tilted in any axis to achieve a correction for detected movement of the device.

Figure 12:
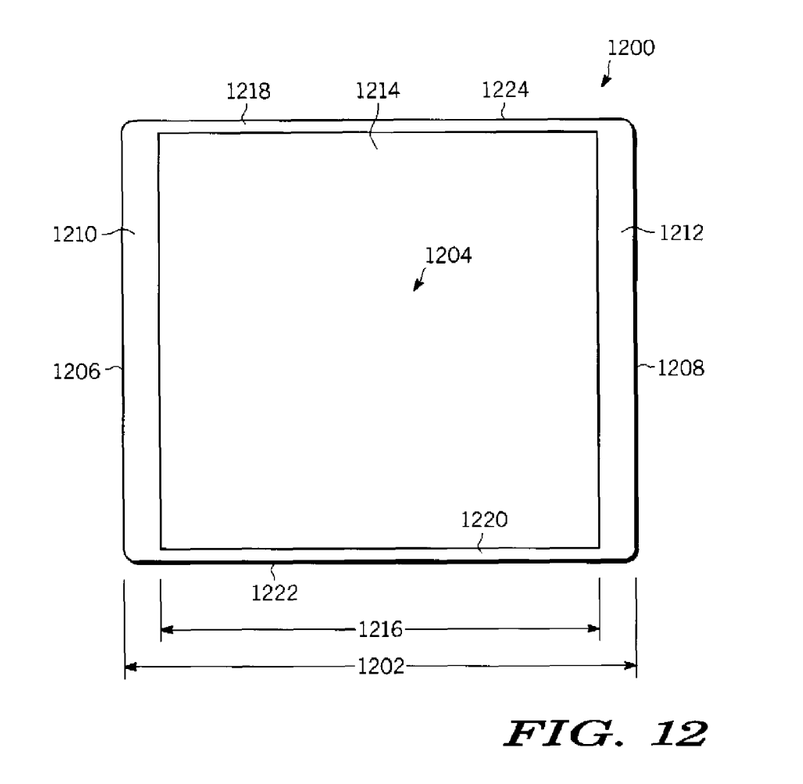
FIG. 12 is an elevational view of a viewing surface with unused image areas.

FIG. 12 shows another embodiment of the present invention where movement compensation is accomplished electronically, meaning the physical movement of the mirror(s) is not altered in response to the projector movement. Instead, the timing relationship between the movement of the mirror (s) and the laser modulation signals is altered in a way that causes the entire projected image to move with respect to the projector, thus compensating the movement of the latter. This technique is best understood by looking at the image area 1200 shown in FIG. 12. The image area 1200 has a width dimension 1202. As the high-speed mirror 112 (not shown in this view) scans across the image area 1200, it reaches a maximum movement speed near the center 1204. At each of the edges 1206 or 1208, the mirror must turn around and begin moving in the opposite direction 1208 or 1206. Therefore, near the edges 1206 and 1208 of the image area 1200, the mirror 112 is preparing to change directions and, as a result, the mirror speed will be slower than in the center 1204 of the image area 1200.

The reduced speed of the mirror 112 along the edges can cause the outer portion of the image area 1200 to be brighter than other portions where the mirror 112 is moving faster and spending less time delivering light to each pixel. For this reason, at least some scanning projectors turn off the light source prior to the mirror 112 reaching the slower edge area. As a result there is are vertical outer edge areas 1210 and 1212 that are not utilized even though the scanning angle of the mirror 112 passes over these areas 1210 and 1212. Therefore, the actual usable image area 1214 has a width 1216 that is smaller than the total image area width 1202.

In one embodiment of the present invention, movement of the projector 300 is compensated for by automatically altering the time that the lasers 118a-c are on. By leaving the lasers 118a-c on while the x-mirror 112 travels into the normally off zone 1210, a movement of the projector 300 along the x-axis toward the edge 1208 can be compensated for. Likewise, by leaving the lasers 118a-c on while the x-mirror 112 travels into the normally off zone 1212, a movement of the projector 300 along the x-axis toward the edge 1206 can be compensated for. Therefore, a simple adjustment to the timing of the light source feeding the high-speed x-mirror 112 can compensate for movement of the projector 300. This compensation technique does not place the image in one of the dead zones 1210, 1212, but instead ensures that the image substantially remains fixed in the usable image area 1214.

As can also be seen in FIG. 12, the viewing area 1200 also has unused areas 1218 and 1220 located above and below, respectively, the usable viewing area 1214. For the same reason areas 1210 and 1212 are unused, the areas 1218 and 1220 are unused. However, since the y-mirror 114 moves at a much slower rate than the x-mirror 112, the unusable areas 1218 and 1220 are much smaller. However, the dead zones 1218 and 1220 can be used for movement compensation the same way the dead zones 1210 and 1212 are used. More specifically, by leaving the lasers 118a-c on while the y-mirror 114 travels into the normally off zone 1218, a movement of the projector 300 along the y-axis toward a lower edge 1222 can be compensated for. Similarly, by leaving the lasers 118a-c on while the y-mirror 114 travels into the normally off zone 1220, a movement of the projector 300 along the y-axis toward the upper edge 1224 can be compensated for.

Figure 13:
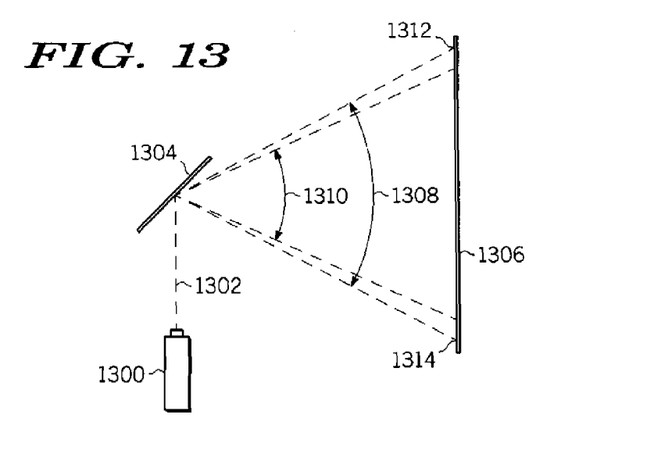
FIG. 13 is a planar view of an elevational view of a viewing surface with unused image areas.

FIG. 13 illustrates how a light source 1300 can be controlled to compensate for projector movement. In FIG. 13, a light source 1300 places a laser beam 1302 onto a mirror 1304, which then reflects the laser beam 1302 to a viewing screen 1306. The mirror 1304 has a maximum angle of movement 1308. However, once a movement of the mirror 1304 exceeds an angle 1310, the light source 1300 shuts off. The mirror 1304 continues to an extent 1312 of its maximum angle of movement 1308, turns around, and continues back toward an opposite extent 1314 of the maximum angle of movement 1308. The light source 1300 turns on again once the mirror angle returns to within the angle 1310.

Figure 14:
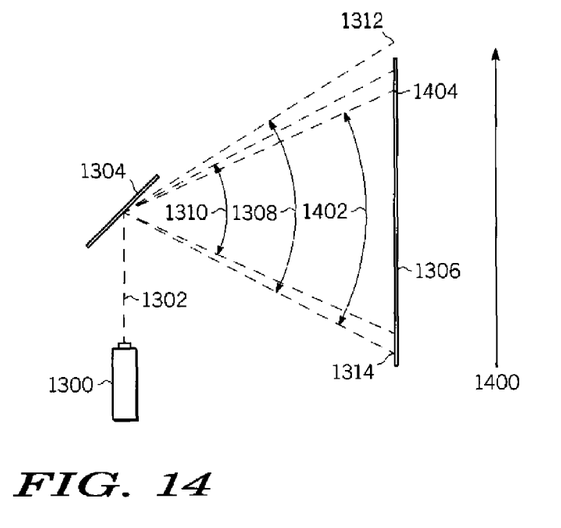
FIG. 14 is a planar view of an imaging screen and a compensation technique using one of the unused image areas of FIGS. 12 and 13 and an electronic light source compensation, according to an embodiment of the present invention.

FIG. 14 shows situation where a physical shift of a projector is compensated for by an adjustment of the light source 1300. In FIG. 13, the maximum angle of movement 1308, which used to be centered onto the screen 1306, is now shifted in a direction 1400. The mirror 1304 still scans from extent 1312 to 1341, however, in its shifted state, the extent 1312 of the maximum angle of movement 1308 extends off of the screen 1306. To compensate for this physical shift, the timing of the light source 1300 adjusts so that it is on when the mirror 1304 is within a new angle 1402, which includes the original extent 1314 of the angle 1308 and a new limit 1404. By altering the timing of the light source's 1300 light emitting cycle, the image can remain in the same area of the screen 1306 as before the physical shift of the projector.

Figure 15:
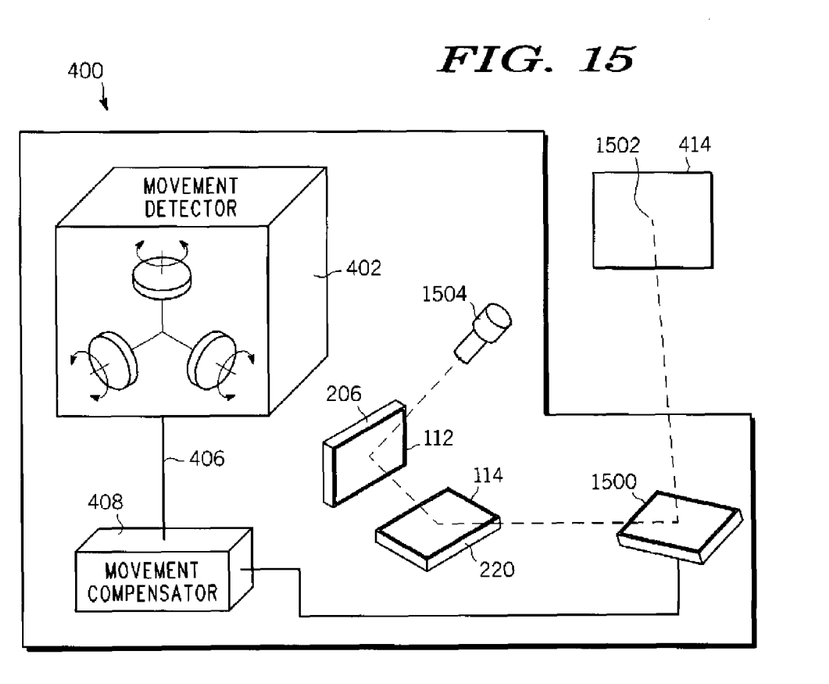
FIG. 15 is a block diagram of a movement-compensating LPD projector assembly with an additional mirror, according to an embodiment of the present invention.

FIG. 15 shows yet another embodiment of the present invention. In this embodiment, an additional mirror 1500 is provided in addition to the high-speed mirror 112 and the low-speed mirror 114. The additional mirror 1500 is, in this embodiment, a movable movement compensating mirror and is guided by the movement compensator 408. The mirror 1500 moves in a direction that opposes a physical movement of the device 400 and projects a steady image 1502 onto the screen 414. Although the additional mirror 1500 is shown receiving the pixel by pixel output of the scanning mirrors 112 and 114, in some embodiments, the additional mirror 1500 is placed between the scanning mirrors 112 and 114 or before the scanning mirrors 112 and 114 in reference to a stream of light output by the laser 1504

Figure 16:
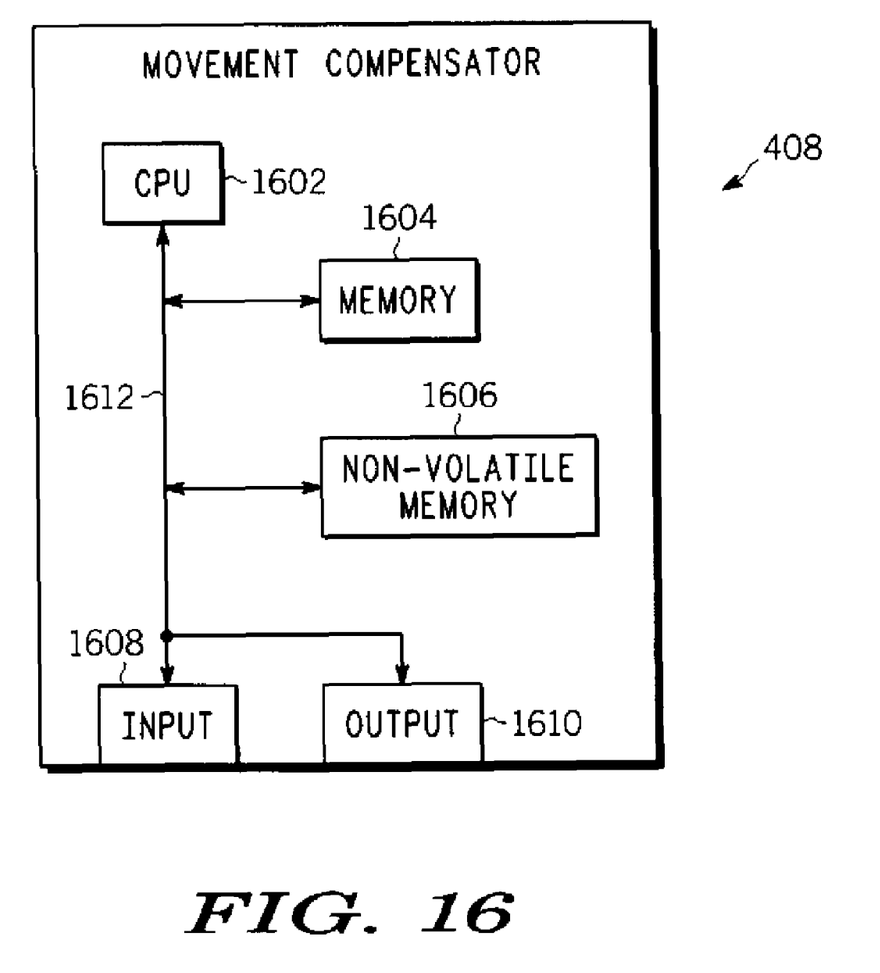
FIG. 16 is a block circuit diagram illustrating an exemplary movement compensator, according to an embodiment of the present invention.

An exemplary embodiment of the movement compensator 408, which is responsible for determining the correction angles, directions, and magnitudes is shown in the block diagram of FIG. 16. The movement compensator 408, in one embodiment, resides within the cradle 512 (not shown in FIG. 16). In other embodiments, the movement compensator 408 resides outside of and is communicatively coupled to one or more of the mirrors 112, 114 and/or to the cradle 512. The movement compensator 408 includes a processor/controller 1602 that is communicatively connected to a main memory 1604 (e.g., volatile memory), a non-volatile memory 1606, an input 1608, and an output 1610. A system bus 1612 interconnects these system components.

The processor/controller 1602, in conjunction with instructions in memory 1604, 1606, efficiently calculates the response to a movement signal received from the movement detector (not shown in FIG. 16) through input 1608. The processor/controller 1602, in conjunction with instructions in memory 1604, 1606 also forms a comparator that compares a received magnitude-of-movement value to a movement-limit value and discontinues sending the correction signal if the magnitude-of-movement value is greater than the movement-limit value. This comparison allows the user of the device to purposefully move the projection target from one area to another without the device trying to compensate against the user's will. The magnitude-of-movement value and the movement-limit value can be user-definable values. The movement compensator 408 may be realized in hardware, software, or a combination of hardware and software. The movement compensator 408 according to an exemplary embodiment of the present invention may be realized in a centralized fashion in one computer system, or in a distributed fashion where different elements are spread across several interconnected areas of a wireless device.

The present invention may also be embedded in a computer program product, which comprises all the features enabling the implementation of the methods described herein, and which—when loaded in a computer system—is able to carry out these methods. Computer program means or computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, flash memory, disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

CONCLUSION

As should now be clear, embodiments of the present invention provide an advantage over prior art devices by correcting for movement of an LPD projector, which uses two varying speed mirrors to sequentially render each pixel of an image. Therefore, corrections can be made to compensate for an image after a frame has begun being drawn, but before it is complete.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An image stabilizer comprising:
   a movement detector;
   a first movable mirror;
   a movement compensator communicatively coupled to the movement detector;
   a first mirror controller communicatively coupled to the compensator and to the first movable mirror, the first mirror controller adapted to control and move the first movable mirror at a first speed;
   a second movable mirror; and
   a second mirror controller communicatively coupled to the compensator and to the second movable mirror, the second mirror controller adapted to control and move the second movable mirror at a second speed different from the first speed,
   wherein the movement compensator, in response to receiving a signal from the movement detector that the projector has moved, communicates at least one compensation signal to at least one of the first and second mirror controllers, the at least one compensation signal capable of causing at least one of the first and second mirror controller to compensate for the detected projector movement.

2. The image stabilizer according to claim 1, wherein:
   the first and second mirrors are components of a laser projection display projector assembly.

3. The image stabilizer according to claim 1, wherein:
   the first mirror is a dedicated horizontally-moving mirror; and
   the second mirror is a dedicated vertically-moving mirror with a movement speed less than a movement speed of the horizontally-moving mirror.

4. The image stabilizer according to claim 1, wherein the movement detector comprises at least one of a gyroscope and an inertia sensor.

5. The image stabilizer according to claim 1, further comprising:
   a plurality of lasers, each operable to output a ray of light to the first mirror.

6. The image stabilizer according to claim 1, further comprising:

a cradle physically coupled to the first and second movable mirrors and communicatively coupled to the movement compensator, wherein the cradle, upon receiving a compensation signal from the movement compensator, moves at least one of the first and second mirrors to compensate for a detected projector movement.

7. The image stabilizer according to claim 6, wherein:

the movement compensator sends a compensation signal to at least one of the first and second mirrors to compensate for a detected physical movement when a value of the signal from the movement detector is below a predefined value and sends a compensation signal to the cradle when a value of the signal from the movement detector is above the predefined value.

8. A laser projector comprising:

a plurality of lasers, each operable to output a ray of light and each of a different color along a given ray path;

a dedicated horizontally-moving mirror disposed in the ray path;

a dedicated vertically-moving mirror disposed in the ray path;

a movement detector operable to detect translational and rotational movement of the laser housing; and a movement compensator communicatively coupled to the movement detector and operable to calculate a compensation movement value for at least one of the horizontally-moving mirror and the vertically-moving mirror, the compensation movement value compensating for a displacement of the at least one of the horizontally-moving mirror and the vertically-moving mirror caused by the detected movement.

9. The laser projector according to claim 8, further comprising:

a first mirror controller communicatively coupled to the compensator and to the horizontally-moving mirror, the first mirror controller adapted to control and move the horizontally-moving mirror at a first speed; and a second mirror controller communicatively coupled to the compensator and to the vertically-moving mirror, the second mirror controller adapted to control and move the vertically-moving mirror at a second speed that is different from the first speed.

10. The laser projector according to claim 9, wherein:

the movement compensator, in response to receiving a signal from the movement detector, communicates a first compensation signal to the first mirror controller and a second compensation signal to the second mirror controller, the first and second compensation signals capable of causing the first mirror controller and the second mirror controller to compensate for a detected physical movement.

11. The laser projector according to claim 8, further comprising:

a distance measurement device for determining a distance from the projector to a viewing surface communicatively coupled to the movement compensator to alter the compensation movement value dependent upon the distance measured.

12. The laser projector according to claim 8, wherein the movement compensator comprises:

a comparator operable to compare a magnitude of projector movement value to a movement limit value and discontinue transmission of a compensation signal if the magnitude of projector movement is greater than the movement limit value.

* * * * *